(12) United States Patent
Sakaguchi

(10) Patent No.: US 7,646,970 B2
(45) Date of Patent: Jan. 12, 2010

(54) IMAGE SENSING APPARATUS, CONTROL METHOD, AND USER INTERFACE DISPLAY APPARATUS

(75) Inventor: Takeshi Sakaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 12/013,858

(22) Filed: Jan. 14, 2008

(65) Prior Publication Data
US 2008/0199168 A1    Aug. 21, 2008

(30) Foreign Application Priority Data
Feb. 19, 2007    (JP) .............................. 2007-038429

(51) Int. Cl.
*G03B 13/22*    (2006.01)
*G03B 13/30*    (2006.01)
(52) U.S. Cl. ........................................ 396/91; 396/147
(58) Field of Classification Search .................. 396/91, 396/93, 147, 529; 348/231.7, 333.02, 346
See application file for complete search history.

(56) References Cited
U.S. PATENT DOCUMENTS
2005/0140815 A1 *    6/2005    Nakano et al. .............. 348/345

FOREIGN PATENT DOCUMENTS
JP    2001-174690 A    6/2001

* cited by examiner

*Primary Examiner*—W. B. Perkey
*Assistant Examiner*—Minh Q Phan
(74) *Attorney, Agent, or Firm*—Canon U.S.A., Inc. I.P. Division

(57) ABSTRACT

An image sensing apparatus on which a plurality of lens units are interchangeably mountable includes a system controller configured to acquired information specific to a mounted lens unit from the mounted lens unit, a detection unit configured to detect a focus shift amount of the mounted lens unit, a display circuit configured to display the specific information acquired by the system controller in association with a focus correction value for correcting the focus shift amount detected by the detection unit, an operation switch configured to be operated by a user, and a setting unit that sets the focus correction value according to an operation on the operation switch.

13 Claims, 10 Drawing Sheets

FIG. 9

0. NO ADJUSTMENT

1. ADJUST ALL

2. ADJUST LENSES SEPARATELY

IMAGE SENSING APPARATUS, CONTROL METHOD, AND USER INTERFACE DISPLAY APPARATUS

BACKGROUND OF THE INVENTION

1. Field of the Invention

The present invention relates to an image sensing apparatus, a control method, and a user interface display apparatus, and more specifically to an image sensing apparatus capable of setting a focus correction value for correcting a focus shift amount detected by a focus detection unit, a control method, and a user interface display apparatus.

2. Description of the Related Art

Heretofore, cameras have been proposed that correct a focus shift amount detected by an automatic focus detection apparatus in the camera, as the result of a user operation.

The following camera proposed in Japanese Patent Laid-Open No. 2001-174690 is an example of this type of camera. First, the user operates an operation member provided on the camera, and sets a focus correction value while checking on a display screen where the correction value of the focus shift amount changes in conjunction with the operation. The set focus correction value is then stored in a nonvolatile memory in association with individual information that includes the serial number of the lens unit. When a lens unit matching the individual information is mounted on the camera, the corresponding focus correction value is read from the nonvolatile memory and the focus shift amount is corrected.

The camera disclosed in Japanese Patent Laid-Open No. 2001-174690 is able to set the correction value of the focus shift amount as a result of a lens unit being mounted on the camera. The user is aware that a focus correction value has been set in relation to the mounted lens unit. This is premised on the mounted lens unit being known to the user.

However, the user may not have identified the mounted lens unit, and normally the user sets the focus correction value while looking at a display screen displayed on a display apparatus installed on the back of the camera. Therefore, setting a focus correction value suitable for the mounted lens unit is difficult while only looking at the information displayed on the display screen. In this case, it is difficult to confirm that a focus correction value has been set for the mounted lens unit, giving rise to shots that have been corrected contrary to the desires of the user.

Moreover, the user is unable to find out the setting information when viewing a captured image. Therefore, the user has no way of knowing how much the captured image has been corrected, and is not presented with information that would allow him or her to determine whether resetting the focus correction value when taking the next shot would better obtain the desired result.

SUMMARY OF THE INVENTION

The present invention has been made in consideration of the above situation, and has as its object to enable a lens unit mounted when setting a focus correction value for correcting the focus shift amount to be confirmed on a screen for setting the focus correction value, in an image sensing apparatus capable of having a plurality of lens units interchangeably mounted thereon.

According to an aspect of the present invention, an image sensing apparatus is provided on which a plurality of lens units are interchangeably mountable. The apparatus includes an acquisition unit configured to acquire information specific to a mounted lens unit from the mounted lens unit; a detection unit configured to detect a focus shift amount of the mounted lens unit; a display unit configured to display the specific information acquired by the acquisition unit, in association with a focus correction value for correcting the focus shift amount detected by the detection unit; an operation member configured to be operated by a user; and a setting unit that sets the focus correction value according to an operation on the operation member.

According to another aspect of the present invention, a user interface display apparatus for an image sensing apparatus on which a plurality of lens units are interchangeably mountable. Here, the display apparatus includes a specific information display unit configured to display information specific to a mounted lens unit; a correction value display unit that displays a focus correction value for correcting a focus shift amount; and an index display unit configured to display an index for setting the focus correction value, wherein according to an operation on an operation member by a user, the index display unit changes display of the index, and the correction value display unit changes display of the focus correction value set using the index.

According yet to another aspect of the present invention, a control method is provided for an image sensing apparatus on which a plurality of lens units are interchangeably mountable. The method includes acquiring information specific to a mounted lens unit from the mounted lens unit; detecting a focus shift amount of the mounted lens unit; displaying the acquired specific information in association with a focus correction value for correcting the detected focus shift amount; setting the focus correction value for correcting the detected focus shift amount according to an operation on an operation member by a user; and updating the displayed focus correction value whenever the focus correction value is set.

Additional features and aspects of the present invention will become apparent from the following description of exemplary embodiments, taken in conjunction with the accompanying drawings.

BRIEF DESCRIPTION OF THE DRAWINGS

FIG. 9 shows an exemplary screen for selecting a setting mode of the focus correction value according to the second embodiment of the present invention.

DESCRIPTION OF THE EMBODIMENTS

Various embodiments of the present invention will be described in detail in accordance with the accompanying drawings.

First Exemplary Embodiment

Figure 1:
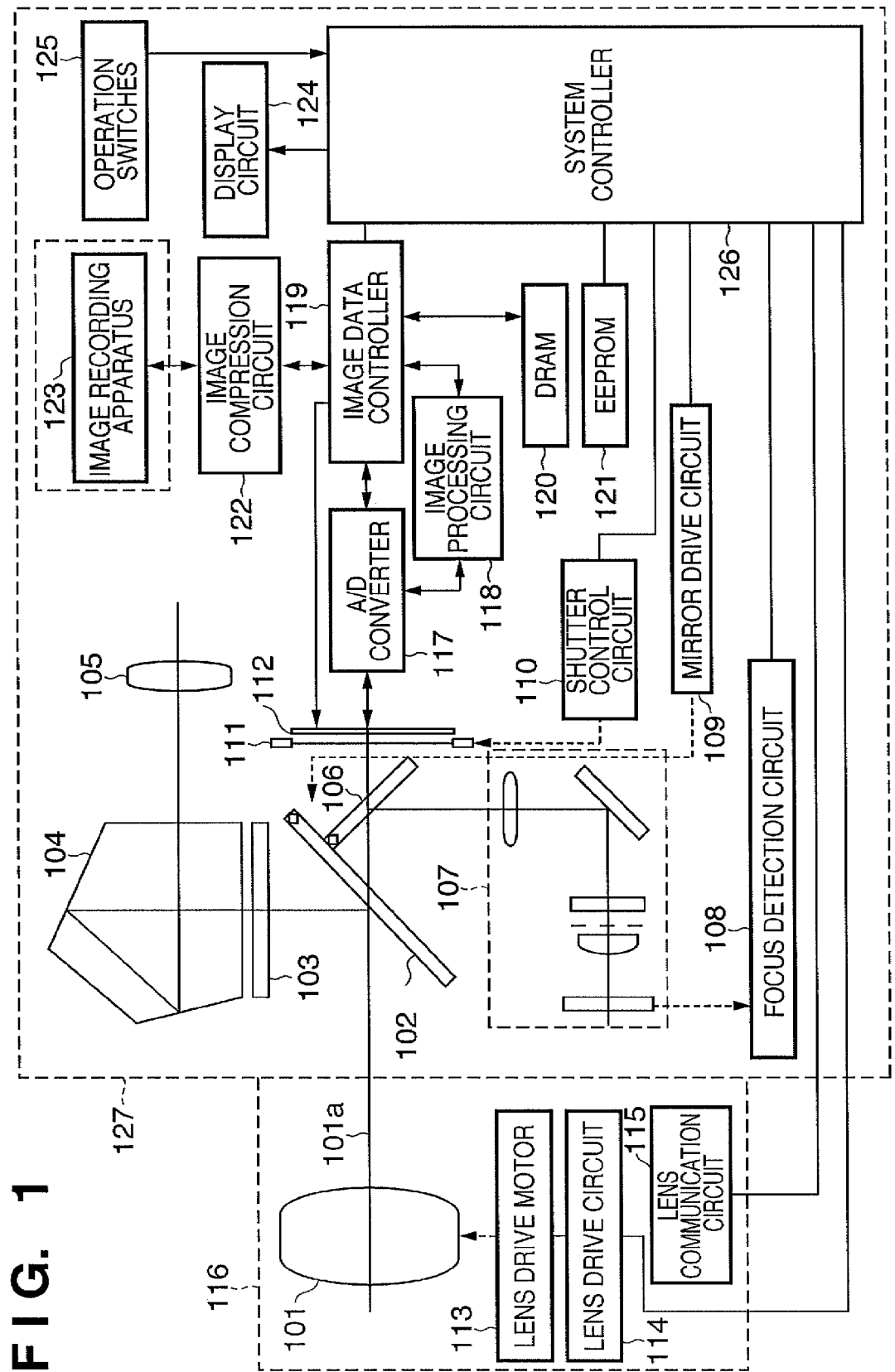
FIG. 1 shows an example configuration of a camera in a first embodiment of the present invention.

FIG. 1 is a block diagram showing the configuration of a single-lens reflex camera in a first embodiment of the present invention. In FIG. 1, reference numeral 127 denotes a camera body, and reference numeral 116 denotes a lens unit that is removably mountable on the camera body 127. A plurality of different lens units besides the lens unit 116 can be interchangeably mounted on the camera body 127, with the lens unit 116 showing one example thereof.

Reference numeral 101 denotes a photographic lens, and reference numeral 112 denotes an image sensing device such as a CCD or CMOS sensor that forms an optical image of an object that passes through the photographic lens 101, and outputs an image signal obtained by converting the formed optical image to a charge according to the quantity of light of the optical image.

Reference numeral 102 denotes a main mirror that has a semi-transmissive portion. The main mirror 102 is removed from the photographic light path when image sensing is performed, and the main mirror 102 is inclined on the photographic light path when focus detection is performed. FIG. 1 shows the main mirror inserted in the photographic light path (mirror down). The main mirror 102, when inclined on the photographic light path, directs part of the luminous flux that passes through the photographic lens 101 to a viewfinder optical system constituted by a focusing plate 103, a pentaprism 104, and an ocular 105.

Reference numeral 106 denotes a sub-mirror that can be folded and expanded relative to the main mirror 102 in sync with the operation of the main mirror 102. The part of the luminous flux that passes through the semi-transmissive portion of the main mirror 102 is reflected downward by the sub-mirror 106, and is incident on a focus detection apparatus 107 that employs a phase difference detection method, where the focusing state of the photographic lens 101 is detected.

The camera body 127 is provided with a system controller 126 constituted by a CPU for controlling the entire camera, and appropriately controls the operations of various units described below.

A focus detection circuit 108 connected to an image sensor 132 (see FIG. 2), a mirror drive circuit 109 for driving the main mirror 102, and a shutter control circuit 110 that controls a focal plane shutter 111 are connected to the system controller 126. Note that a detection unit that detects the focus shift amount is constituted by the focus detection circuit 108 and the focus detection apparatus 107.

Further, a lens drive circuit 114 for driving a lens drive motor 113 that drives a motor in order to focus the photographic lens 101 is connected to the system controller 126 via a lens mount (not shown). A lens communication circuit 115 for communicating between the lens unit 116 and the camera body 127 is also connected to the system controller 126.

The lens communication circuit 115 analyses communication commands transmitted from the system controller 126, and transmits information on the lens corresponding to the communication commands to the camera body 127. These communication commands include a command for acquiring lens-specific information which is information specific to the lens unit 116. Note that the lens-specific information may include a lens name or an extender name in the case where an extender is attached between the camera body 127 and the lens unit 116.

An acquisition unit that acquires lens-specific information is thus formed as a result of the system controller 126 communicating with the lens communication circuit 115. An EEPROM 121 storing parameters that need to be adjusted in controlling the camera is also connected to the system controller 126.

An image data controller 119 that controls the various apparatuses for capturing and recording images based on instructions from the system controller 126 is also connected to the system controller 126. An analog-to-digital (A/D) converter 117 for converting an analog signal corresponding to an object image that has passed through the photographic lens 101 and been output from the image sensing device 112 to a digital signal is connected to the image data controller 119. An image processing circuit 118 that processes the output signal from the A/D converter 117 and a DRAM 120 that is used as a storage unit for temporarily storing image data are also connected to the image data controller 119. An image compression circuit 122 for compressing image data stored in the DRAM 120 and performing JPEG conversion, for example, is further connected to the image data controller 119.

Image data compressed by the image compression circuit 122 is recorded to an image recording apparatus 123 that is removably mountable on the camera.

A display circuit 124 is an exemplary display unit that displays image data sent from the image data controller 119 and a screen (interface) for setting the focus correction value (described later), based on instructions from the system controller 126. That is, a user interface display apparatus is constituted by the display circuit 124 and the system controller 126. Operation switches 125 include operation members such as a release button and switches for operating camera operating modes, photographic conditions (focus correction value), and exposure information (shutter speed, aperture stop value, etc.). The system controller 126 instructs the display circuit 124 to display the foregoing information according to user operations. That is, the system controller 126 in this case acts as a setting unit.

Figure 2:
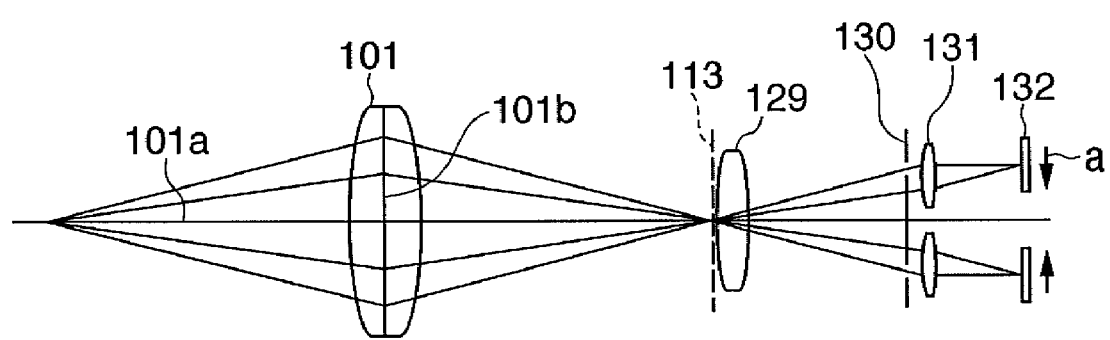
FIG. 2 shows a focus detection principle of a phase difference detection method.

FIG. 2 is a light path diagram illustrating the principle for detecting the focusing state using the focus detection apparatus 107, with the constituent elements deployed on the light axis of the photographic lens 101. The main mirror 102 and the sub-mirror 106 have, however, been omitted in FIG. 2. Note that in FIG. 2 the same reference numerals have been attached to the same constituent elements as FIG. 1.

The focus detection apparatus 107 has a field lens 129, an aperture stop 130 having a pair of apertures, a pair of secondary imaging lenses 131, and an image sensor 132 composed of a pair of photoelectric conversion devices and the like.

Luminous flux emitted from a point on a light axis 101a forms an image on the image sensing device 112 after passing through the photographic lens 101, and also forms an image on the image sensor 132 at a given interval via the field lens 129, the aperture stop 130, and the secondary imaging lenses 131.

The field lens 129 is disposed so that an image is formed in proximity to the entrance pupil of a pupil 101b of the photographic lens 101 and the pair of secondary imaging lenses 131, that is, in proximity to the aperture stop 130. The pupil 101b of the photographic lens 101 is divided in the vertical direction of FIG. 2, in correspondence with the pair of apertures in the aperture stop 130.

In the above configuration, when luminous flux forms an image to the left of the image sensing device 112 after extending the photographic lens 101 to the left in FIG. 2, the pair of images on the image sensor 132 are displaced in the direction of the arrow a. Detecting the relative amount of deviation of the pair of images enables the focusing state of the photographic lens 101 to be detected and further enables the focusing drive of the photographic lens 101 to be performed. Note that the pair of images on the image sensor 132 is displaced in the opposite direction to the arrow a in FIG. 2 when the photographic lens 101 is retracted to the right in FIG. 2.

Figure 3:
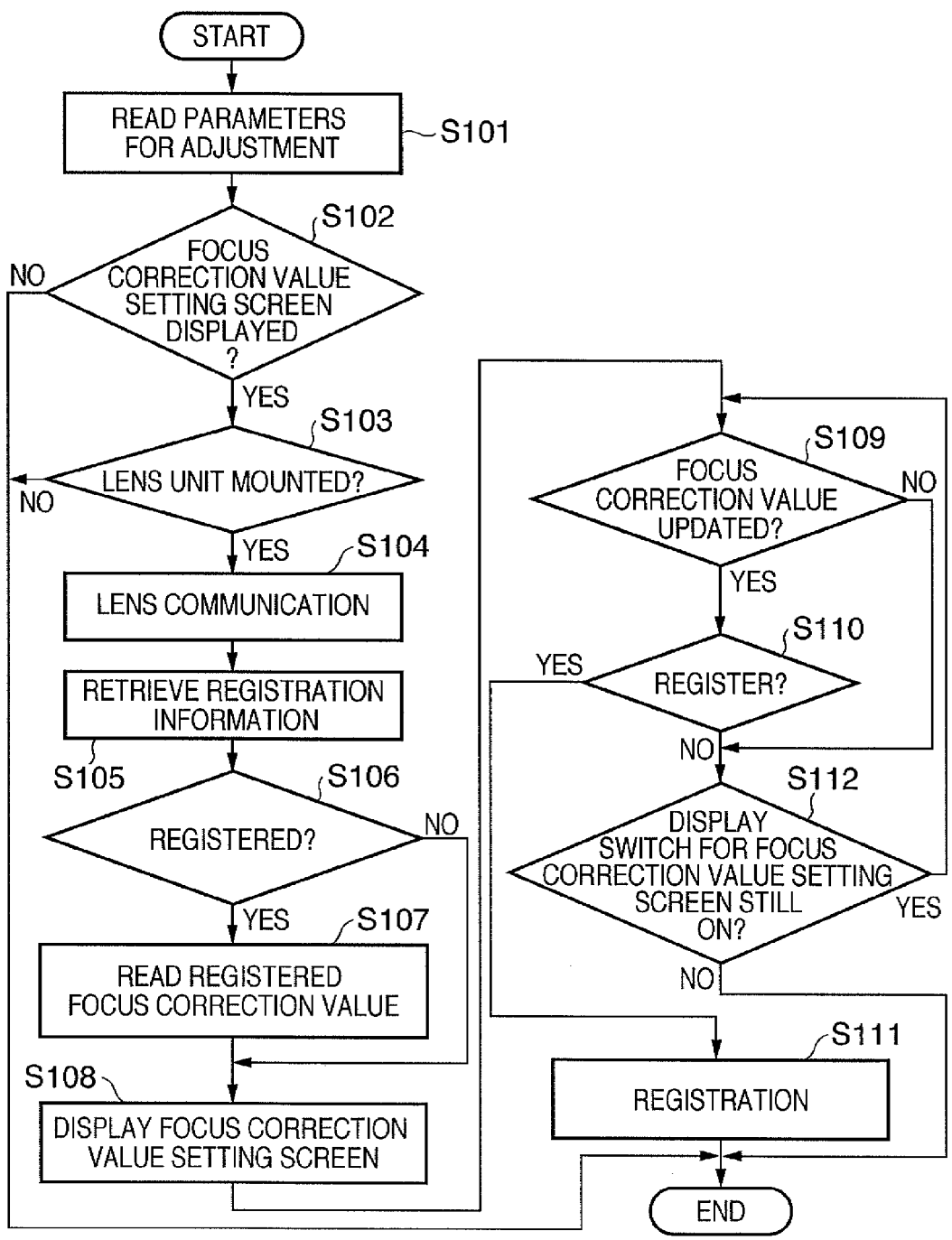
FIG. 3 is a flowchart showing an example procedure for setting a focus correction value according to a first embodiment of the present invention.

A method of setting the focus correction value for correcting the focus shift amount in the first embodiment will be described next, with reference to the flowchart of FIG. 3. When a power switch included in the operation switches 125 is turned on, power is fed to the camera body 127, and the system controller 126 starts the operation shown in the flowchart of FIG. 3.

At step S101, parameters that need to be adjusted in controlling the camera are read from the EEPROM 121. These parameters include the registration information of focus correction values.

At step S102, the processing proceeds to step S103 if the display switch of a screen for setting the focus correction value, which is one of the operation switches 125, is turned on, while processing to set the focus correction value is ended if the display switch is not turned on.

At step S103, the system controller 126 checks whether a lens unit is mounted on the camera body 127. This check is performed because a lens unit needs to be mounted to set the focus correction value, since the focus correction value is registered in relation to the lens-specific information of the mounted lens unit. The processing proceeds to step S104 if a lens unit is mounted, while processing to set the focus correction value is ended if a lens unit is not mounted. Note that a display notifying that a lens unit is not mounted may be performed at this time.

At step S104, lens communication is performed, and the lens-specific information of the mounted lens unit is acquired. The lens-specific information includes information such as lens name or extender name.

At step S105, the registration information of a focus correction value stored in the EEPROM 121 is retrieved, based on the lens-specific information of the lens unit acquired at step S104. That is, the system controller 126 in this case operates as a determination unit.

At step S106, the system controller 126 determines whether a focus correction value for the mounted lens unit is registered. If registered, the processing proceeds to step S107, where the focus correction value is read from the EEPROM 121, and then proceeds to step S108. On the other hand, if a focus correction value for the mounted lens unit is not registered, the processing proceeds directly to step S108.

Figure 4:
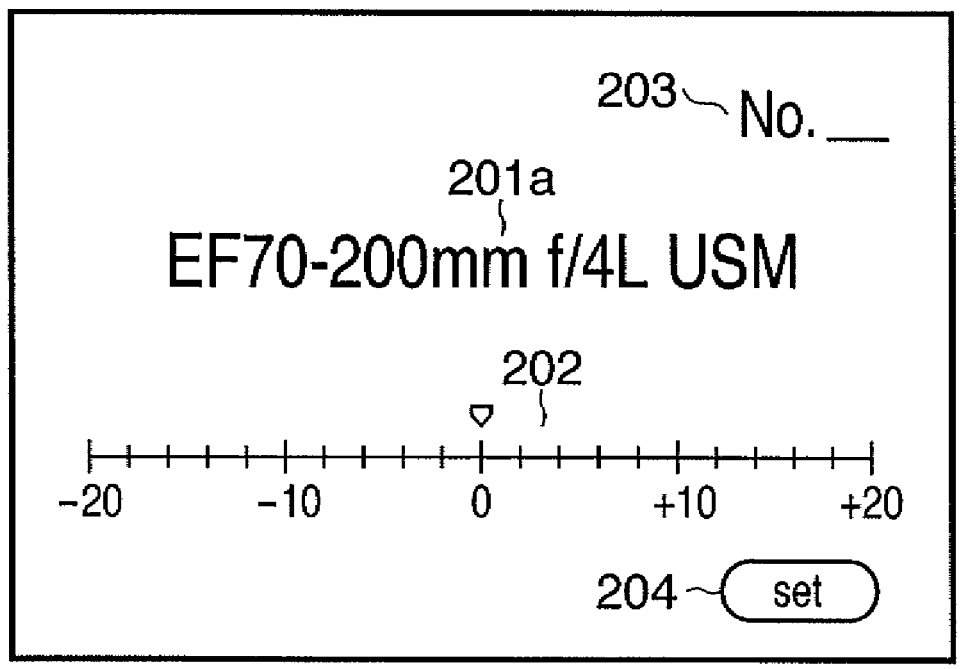
FIG. 4 shows an exemplary screen for setting the focus correction value according to the first embodiment of the present invention.
Figure 5:
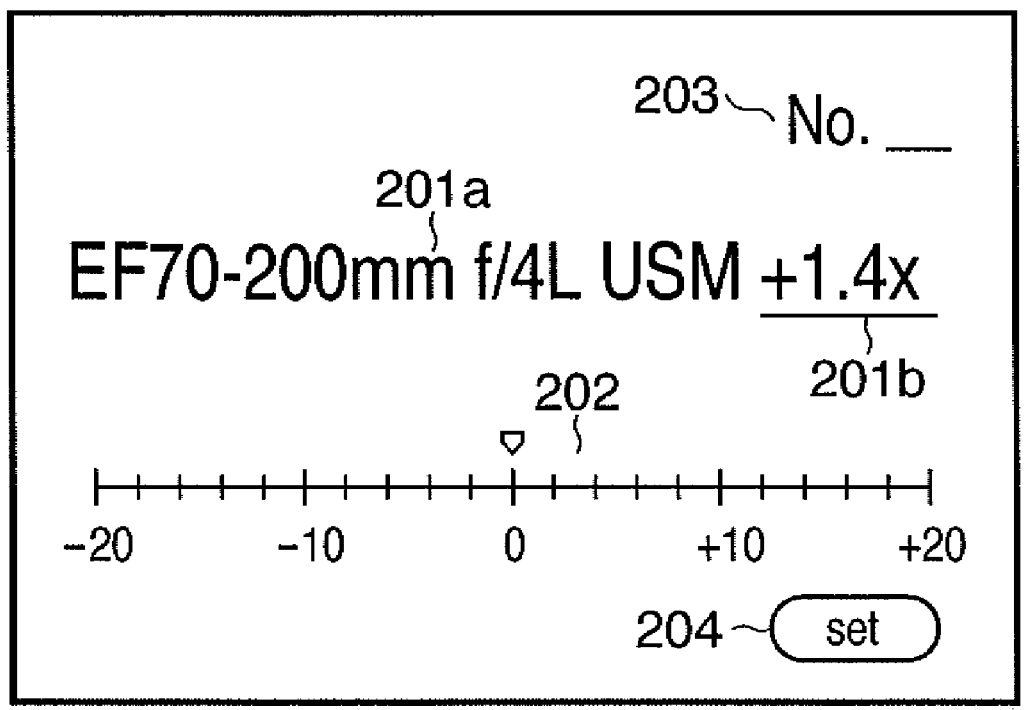
FIG. 5 shows another exemplary screen for setting the focus correction value according to the first embodiment of the present invention.

At step S108, display of a screen (interface) for setting the focus correction value, such as shown in FIGS. 4 and 5, is performed. As for the information displayed in the example shown in FIG. 4, a name 201a of the lens unit, a scale 202 for setting the focus correction value, and a registration number 203 are included in the lens-specific information. A set button 204 for newly registering a focus correction value or changing registered details is also displayed. If an extender is mounted, an extender name 201b is also displayed as shown in FIG. 5, based on information on the extender name acquired at step S104.

Here, one calibration of the focus correction value 202 is decided by scaling, that is, by the depth of field (DoF) which is obtained by acquiring the open F value (maximum aperture) of the lens unit at step S104, and deriving the product of the open F value and the acceptable circle of confusion (CoC). In the present embodiment, if DoF is shallow due the open F value being small, the focus shift amount relative to one calibration of the focus correction value 202 will be small in comparison to the case of a deep DoF. Were focus in the case of a shallow DoF to be shifted by the same amount as for a deep DoF, the shift amount may deviate well outside the depth of field in the former case, even though it would be inside the depth of field in the latter case. Note that this scaling may be an absolute amount that is not dependent on the lens unit. For example, regardless of what lens is mounted, focus may be shifted by 10 mm per calibration. In this case, the focus shift amount can be decided based on the user's sensibility.

This scaling for deciding one calibration of the focus correction value 202 can be performed by the system controller 126 (scaling unit). The units of the focus correction values stored in the EEPROM 121 may be amounts determined by the depth of field obtained by deriving the product of the open F value and the acceptable circle of confusion, or be absolute values that are not dependent of the lens unit.

Note that the foregoing description discloses in relation to the case where the EEPROM 121 is used as the storage unit for storing the lens-specific information and focus correction values. However, the storage unit is not limited to the EEPROM 121, and this information may be stored in an internal memory (not shown) or recorded to the image recording apparatus 123. A storage medium that is able to retain the stored content even after the camera body 127 has been powered off is, however, preferable.

The setting screens of FIGS. 4 and 5 are exemplary, and the present invention is not limited to the setting screens shown in FIGS. 4 and 5. It is adequate if some sort of index for changing lens-specific information and focus correction values is displayed. These displays can be achieved by, for example, storing a computer program for displaying setting screens in the EEPROM 121 or the like, executing the program with the system controller 126, and controlling the display circuit 124. Consequently, a specific information display unit, a correction value display unit, and an index display unit are constituted by the computer program, the system controller 126 and the display circuit 124.

At step S109, the system controller 126 determines whether the focus correction value has been changed using a switch for changing the focus correction value, which is one of the operation switches 125. The processing proceeds to step S110 if the focus correction value has been updated, and to step S112 if the focus correction value has not been updated.

At step S110, the system controller 126 determines whether to register the change in the focus correction value. This is determined according to whether the set button 204 shown in FIGS. 4 and 5 has been pressed. If the set button 204 has been pressed, the processing proceeds to step S111, where the focus correction value is stored in the EEPROM 121 in association with the lens-specific information of the lens unit. The registration number 203 shown in FIGS. 4 and 5 is incremented by one at this time, and processing to set the focus correction value is ended. If the set button 204 has not been pressed, the processing proceeds to step S112.

At step S112, the system controller 126 checks the state of the display switch of the screen for setting the focus correction value, which is one of the operation switches 125, and if still on, returns to step S109 and repeats the above processing. If the display switch is off, processing to set the focus correction value is ended.

Figure 6:
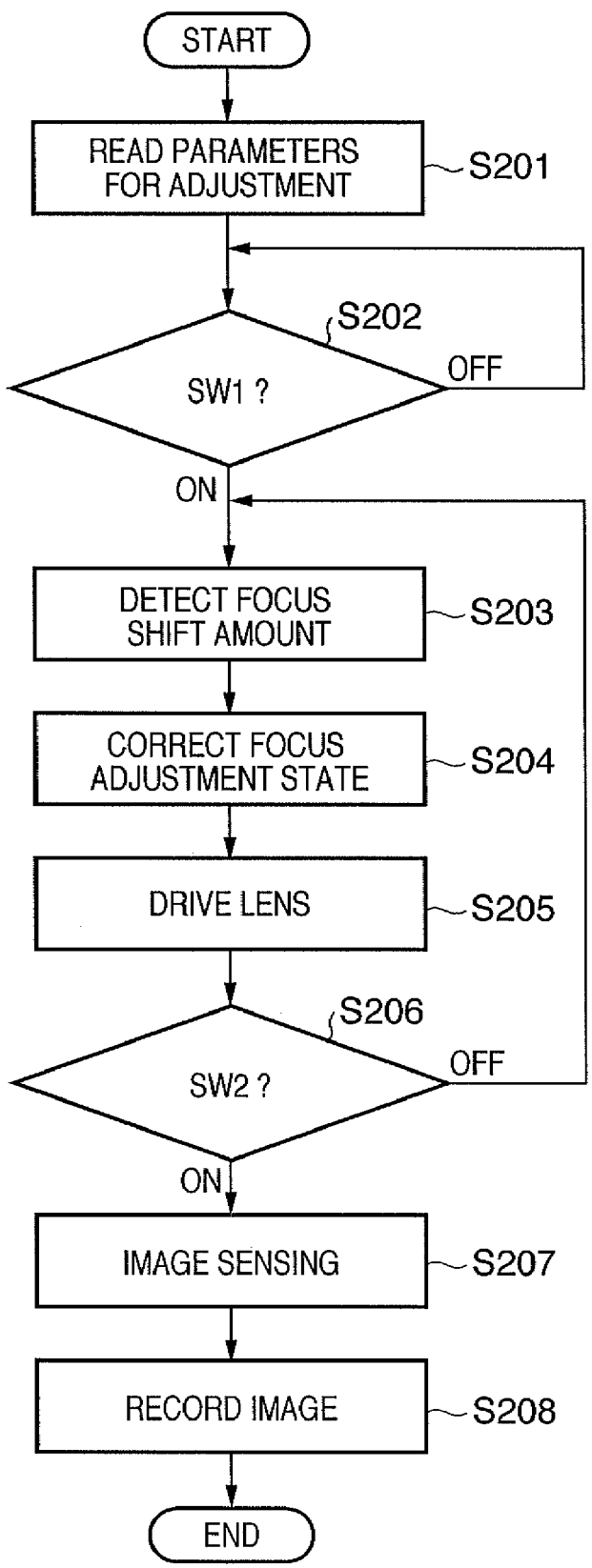
FIG. 6 shows an example operation flowchart of the camera according to the first embodiment of the present invention.

The processing flow for correcting the focus shift amount in an automatic focus detection apparatus of the camera system in the first embodiment, and recording the focus correction value in the Exif information of the image will be described next using the flowchart shown in FIG. 6.

At step S201, parameters that need to be adjusted in controlling the camera are read. These parameters include the registration information of focus correction values.

At step S202, the system controller 126 determines whether SW1, which is turned on by a first stoke operation (half press) of a release button included in the operation switches 125, is on. The processing proceeds to step S203 if SW1 is on, and reverts to a standby state if SW1 is off.

At step S203, the focus detection apparatus 107 detects the focus shift amount as a result of the foregoing focus detection of the phase difference method. At step S204, the detected focus shift amount is then corrected using the correction value of the focus shift amount adjusted when the camera was shipped and stored in the EEPROM 121, and the focus correction value set by the user as described above with reference to FIG. 3.

At step S205, the focus shift amount corrected at step S204 is converted to a defocus amount, and the lens drive motor 113 is driven via the lens drive circuit 114 by converting the defocus amount to a pulse number for driving the focus lens.

At step S206, the system controller 126 determines whether SW2, which is turned on by a second stroke operation (full press) of the release button, is on. The processing proceeds to step S207 if SW2 is on, and returns to the focus detection of step S203 if SW2 is off.

At step S207, the main mirror 102 and the sub-mirror 106 are removed from the photographic light path using the mirror drive circuit 109, and the image sensing device 112 is exposed using the switching operation of the shutter control circuit 110.

At step S208, the image data controller 119 records the image signal output from the image sensing device 112 via the A/D converter 117 to the image recording apparatus 123 as image data via the image processing circuit 118. At this time, the system controller 126 additionally records the focus correction value and the lens-specific information in the Exif information recorded in association with the image data. Note that the image data and the Exif information form a single image file.

Here, one unit of the focus shift amount recorded in the image file may be an amount decided by the open F value as described above, or an absolute amount that is not dependant on the lens unit.

According to the first embodiment as described above, the user is able to obtain sufficient information when setting the focus correction value, since lens-specific information that includes the name of the lens unit is acquired when the lens unit is mounted on the camera body, and the acquired lens-specific information is displayed on a screen for setting the focus correction value. Further, since information on the focus correction value can also be obtained when viewing a captured image, information is reflected for the next shot, enabling the user to obtain a desired result.

Also, the case where an extender has been mounted is distinguished from the case where an extender has not been mounted by adding the extender name to the lens-specific information, enabling the focus correction value setting and the name of the lens unit to be displayed. Consequently, it is possible to address changes in the photographic conditions due to the mounting of an extender.

Figure 7:
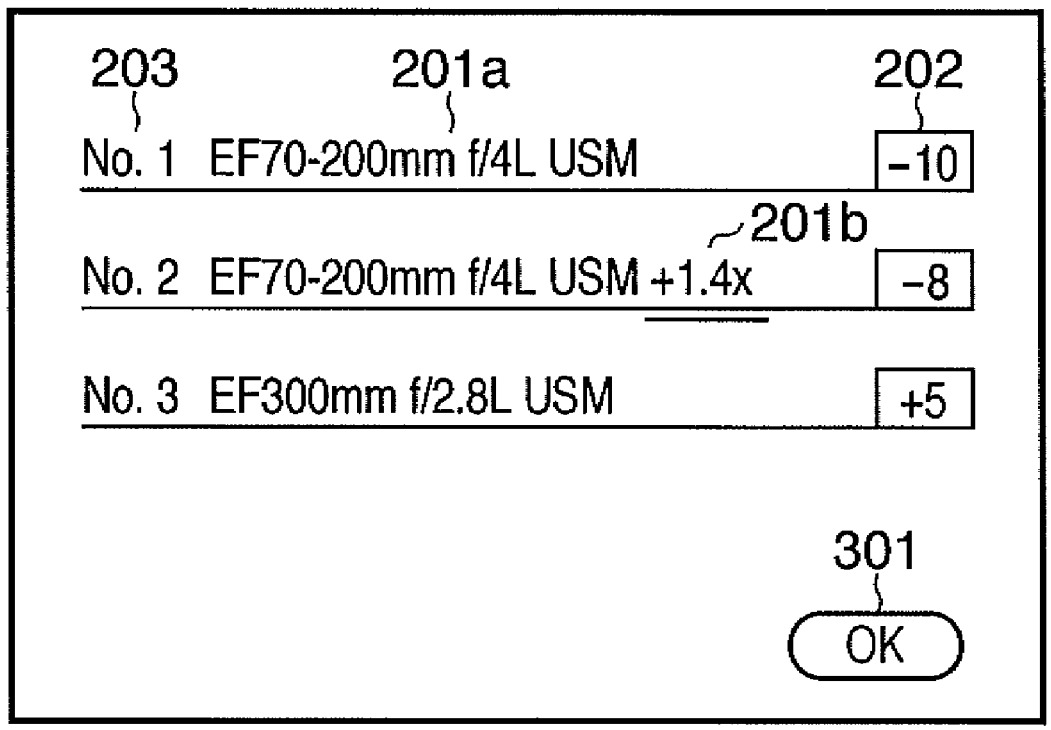
FIG. 7 shows an example screen listing focus correction value settings according to the first embodiment of the present invention.

Here, registration information can also be displayed as a list as shown in FIG. 7, since a plurality of focus correction value settings can be registered with respect to each item of the lens-specific information of a lens unit. Settings to newly register or change a focus correction value can, however, only be performed in relation to a mounted lens unit. Note that reference numeral 301 in FIG. 7 denotes a confirmation button for exiting the list display.

Further, the focus correction value and lens-specific information can be output when an image file is printed, since the Exif information is recorded in the image file. Thus, even when viewing an image, the user is able to confirm the lens unit and focus correction value with which the image was taken.

Also, since the focus correction value and the lens-specific information are additionally recorded in the Exif information of an image file in an image recording apparatus that is removably mountable on a camera, display can be performed with devices other than a camera, such as a personal computer (PC), for example, on which the image recording apparatus is removably mountable. Even with these devices, the user is able to confirm the lens unit and focus correction value with which an image was taken.

Consequently, the user can be presented with information that allows him or her to determine, while looking at a captured image, whether resetting the focus correction value for the next shot would better obtain the desired result, since the focus correction value can also be known from the image file of a captured image, rather than only when being set.

Second Exemplary Embodiment

A second embodiment of the present invention will be described next. In the second embodiment, a plurality of modes are provided with regard to setting the focus correction value, and the setting of the focus correction value according to these modes will be described. The processing in the second embodiment will now be described with reference to the flowchart of FIG. 8. Note that the image sensing apparatus of the second embodiment has a similar configuration to that described in the first embodiment with reference to FIG. 1, and description thereof will be omitted here. Also, in FIG. 8, the same reference numerals are attached to similar processing in FIG. 3, and description thereof will be omitted as appropriate.

Figure 8:
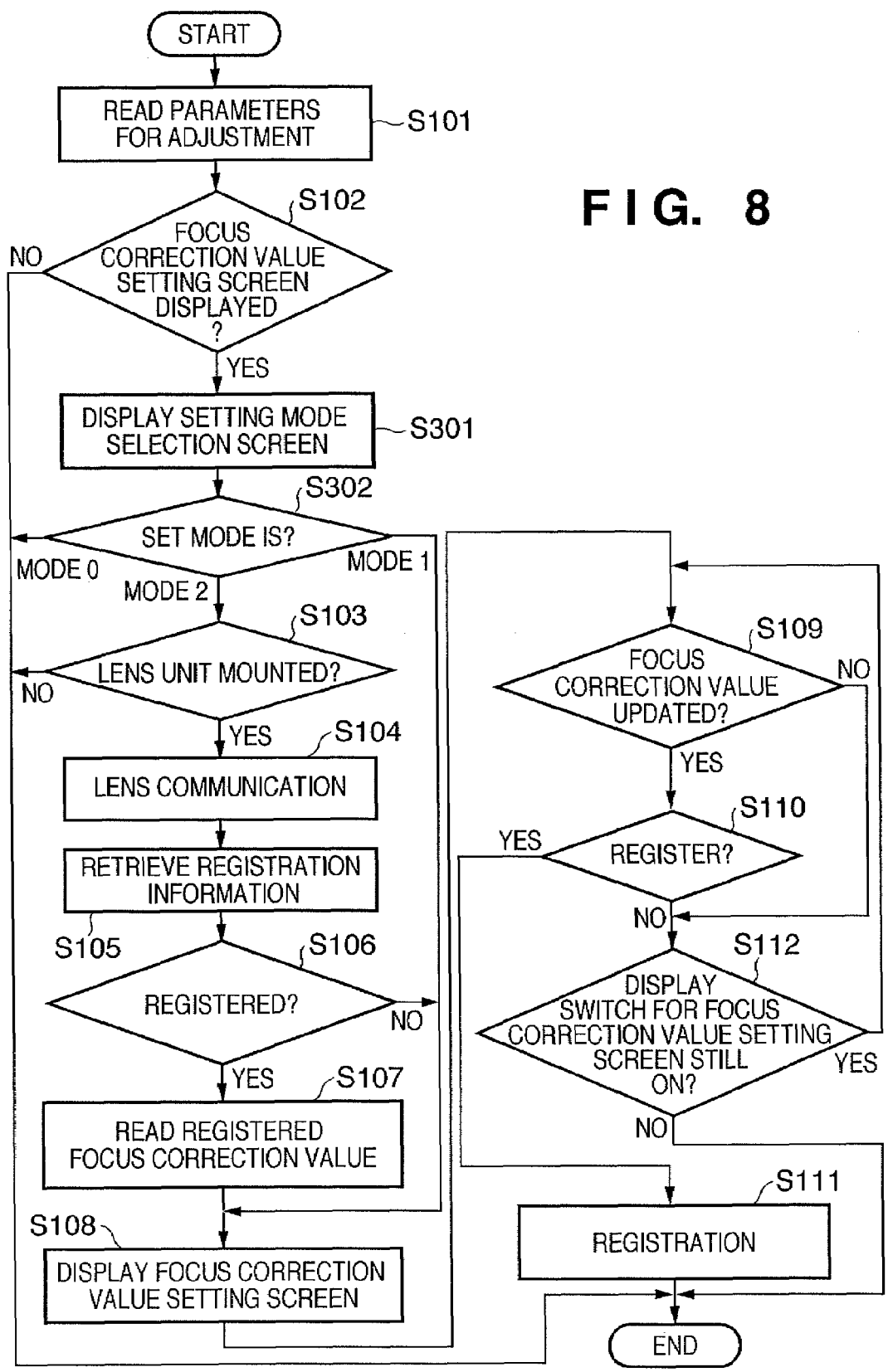
FIG. 8 is a flowchart showing an example procedure for setting the focus correction value according to a second embodiment of the present invention.

When a power switch included among the operation switches 125 is turned on, power is fed to the camera body 127, and the system controller 126 starts the operation shown in the flowchart of FIG. 8. Parameters that need to be adjusted in controlling the camera are then read from the EEPROM 121 at step S101. These parameters include the registration information of focus correction values.

At step S102, the processing proceeds to step S301 if the display switch of a screen for setting the focus correction value, which is one of the operation switches 125, is turned on, while processing to set the focus correction value is ended if the display switch is not turned on.

At step S301, a selection screen such as shown in FIG. 9 is displayed on the display circuit 124. In the screen shown in FIG. 9, "0" is a mode in which the focus correction value is not adjusted (hereinafter, "mode 0"), "1" is a mode in which uniform adjustment is performed irrespective of the mounted lens unit (hereinafter, "mode 1"), and "2" is a mode in which the focus correction value is adjusted according to the lens unit (hereinafter, "mode 2").

Figure 10:
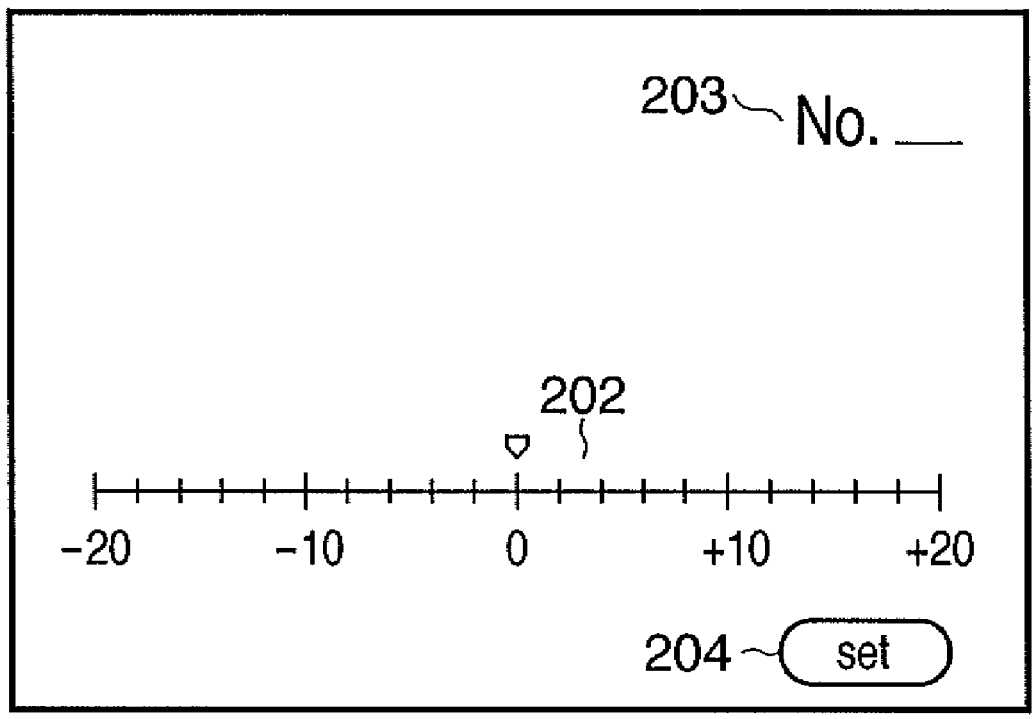
FIG. 10 shows an exemplary screen for setting the focus correction value according to the second embodiment of the present invention.

At step S302, a mode for setting the focus correction value is selected, with processing to set the focus correction value being ended if mode 0 is selected since adjustment is not performed. If mode 2 is selected, the processing of steps S103 to S112 is performed as described in the first embodiment, after which processing to set the focus correction value is ended. On the other hand, if mode 1 is selected, the processing proceeds to step S108, where a screen for setting the focus correction value is displayed. In mode 1, however, a screen such as shown in FIG. 10 is displayed, since adjustment is performed uniformly irrespective of the lens unit.

In mode 2 the focus correction value cannot be adjusted when a lens unit is not mounted, whereas in mode 1 the focus correction value can be adjusted even when a lens unit is not mounted. This is because mode 1 does not require information on the lens unit since adjustment is performed uniformly irrespective of the mounted lens unit, while mode 2, on the other hand, does require information on the lens unit. Thus, in mode 2, erroneous input due to the focus correction value being adjusted despite a lens unit not being mounted can be avoided.

Also, mode 1 allows the user to adjust the focus correction value on a timely basis even if a lens unit is not mounted. Consequently, if mode 1 is selected, the focus correction value will be displayed regardless of whether a lens unit is mounted. On the other hand, if mode 2 is selected, the focus correction value will not be displayed when a lens unit is not mounted. The focus correction value will be displayed when a lens unit is mounted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-038429, filed Feb. 19, 2007, which is hereby incorporated by reference herein in its entirety.

What is claimed is:

1. An image sensing apparatus on which a plurality of lens units are interchangeably mountable, the apparatus comprising:
  an acquisition unit configured to acquire information specific to a mounted lens unit from the mounted lens unit;
  a detection unit configured to detect a focus shift amount of the mounted lens unit;
  a display unit configured to display the specific information acquired by the acquisition unit, in association with a focus correction value for correcting the focus shift amount detected by the detection unit;
  an operation member configured to be operated by a user; and
  a setting unit that sets the focus correction value according to an operation on the operation member.

2. The image sensing apparatus according to claim 1, further comprising:
  a storage unit configured to store the specific information acquired by the acquisition unit, in association with the focus correction value set by the setting unit; and
  a determination unit configured to determine whether a focus correction value corresponding to the specific information acquired by the acquisition unit is stored in the storage unit, if the lens unit is interchanged, wherein
  if it is determined by the determination unit that a corresponding focus correction value is stored, the display unit reads the corresponding focus correction value from the storage unit and displays the read focus correction value in association with the specific information, prior to the focus correction value setting by the setting unit.

3. The image sensing apparatus according to claim 1, wherein the specific information includes a name of the lens unit.

4. The image sensing apparatus according to claim 1, wherein the specific information includes a name of an extender mounted on the lens unit.

5. The image sensing apparatus according to claim 1, wherein the image sensing apparatus includes a scaling unit that scales the focus correction value using the open F value, and
  wherein the acquisition unit further acquires an open F value from the mounted lens unit.

6. The image sensing apparatus according to claim 5, wherein the setting unit corrects the focus correction value using a value scaled by the scaling unit.

7. The image sensing apparatus according to claim 1, further comprising:
  an image sensing device configured to convert an incident optical image of an object to an image signal and outputs the image signal; and
  a recording unit configured to record the image signal obtained from the image sensing device, in association with the specific information, acquired by the acquisition unit, of the lens unit mounted when the image signal is acquired, and the focus correction value set by the setting unit.

8. The image sensing apparatus according to claim 1, comprising a selector that selects one of a first mode for not setting a focus correction value, a second mode for setting a uniform focus correction value independently of a mounted lens unit, and a third mode for setting a focus correction value according to a mounted lens unit, wherein
  the display unit displays the specific information in association with the focus correction value, if the third mode is selected.

9. A user interface display apparatus in an image sensing apparatus on which a plurality of lens units are interchangeably mountable, the display apparatus comprising:
  a specific information display unit configured to display information specific to a mounted lens unit in association with a focus correction value for correcting a focus shift amount;
  the correction value display unit that displays a focus correction value and
  an index display unit configured to display an index for setting the focus correction value,
  wherein according to an operation on an operation member by a user, the index display unit changes display of the index, and the correction value display unit changes display of the focus correction value set using the index.

10. The user interface display apparatus according to claim 9, further comprising a mode option display unit configured to display an option for selecting one of a first mode for setting a uniform focus correction value independently of a mounted lens unit, and a second mode for setting a focus correction value according to a mounted lens unit,
  wherein the mode option display unit, if the first mode is selected, displays a focus correction value regardless of whether a lens unit is mounted, and, if the second mode is selected, the mode option display unit does not display a focus correction value in a case where a lens unit is not mounted.

11. The user interface display apparatus according to claim 10, wherein the specific information display unit displays the specific information if the second mode is selected.

12. A control method for an image sensing apparatus on which a plurality of lens units are interchangeably mountable, comprising:

acquiring information specific to a mounted lens unit from the mounted lens unit;

detecting a focus shift amount of the mounted lens unit;

displaying the acquired specific information in association with a focus correction value for correcting the detected focus shift amount;

setting the focus correction value for correcting the detected focus shift amount according to an operation on an operation member by a user; and updating the displayed focus correction value whenever the focus correction value is set.

13. The control method according to claim 12, further comprising:

storing the specific information in a storage unit in association with the set focus correction value; and determining whether a focus correction value corresponding to the acquired specific information is stored in the storage unit, if the lens unit interchanged, wherein if it is determined that a corresponding focus correction value is stored, the corresponding focus correction value is read from the storage unit and displayed in association with the specific information.

\* \* \* \* \*